INVENTOR.
RAY EBERHART
JOHN F. HANFLAND
BY M. A. Hobbs
ATTORNEY

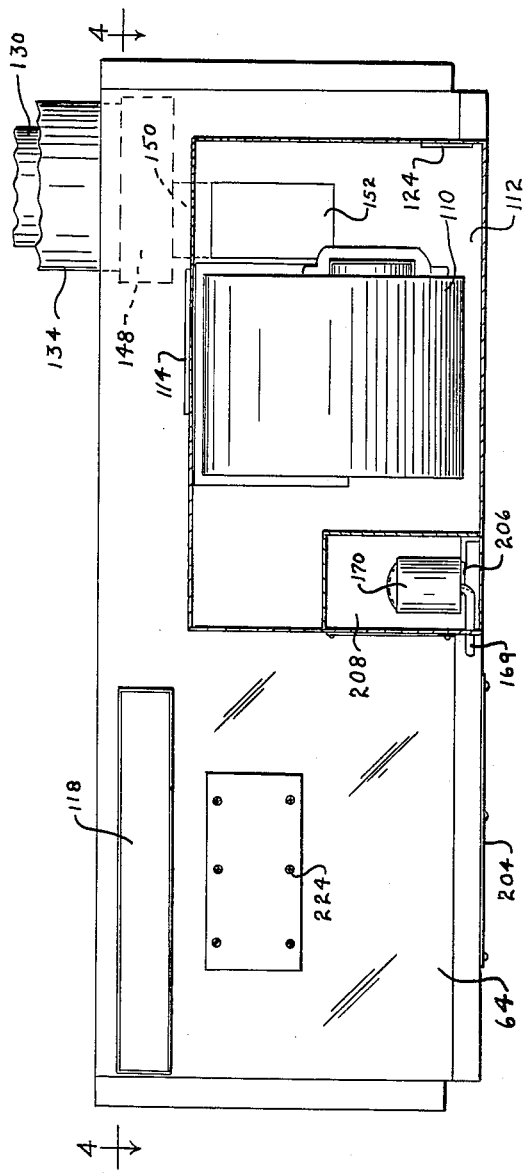
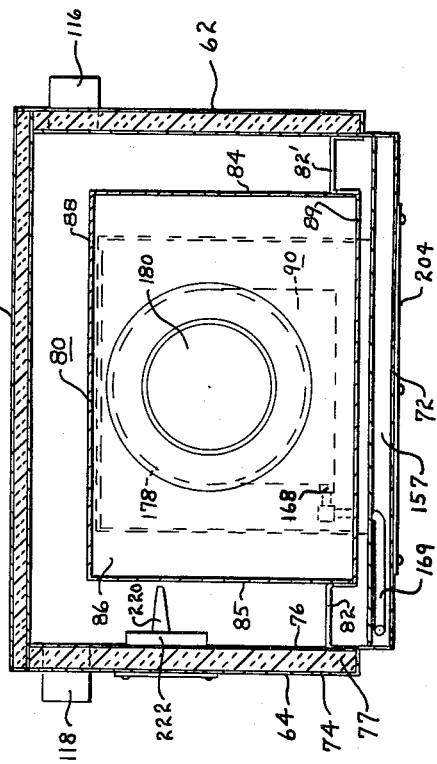

INVENTOR.
RAY EBERHART
JOHN F. HANFLAND
BY M. A. Hobbs
ATTORNEY

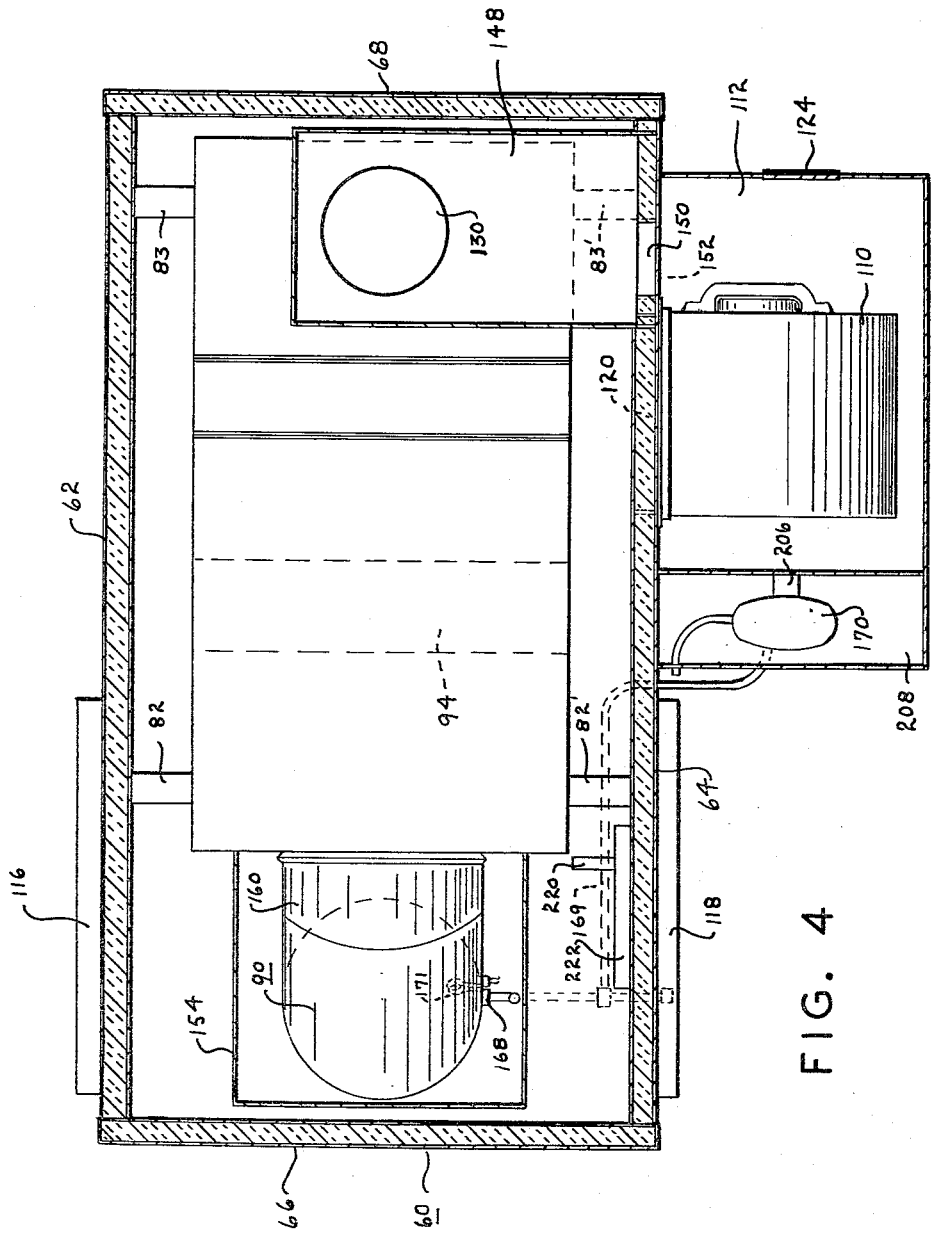

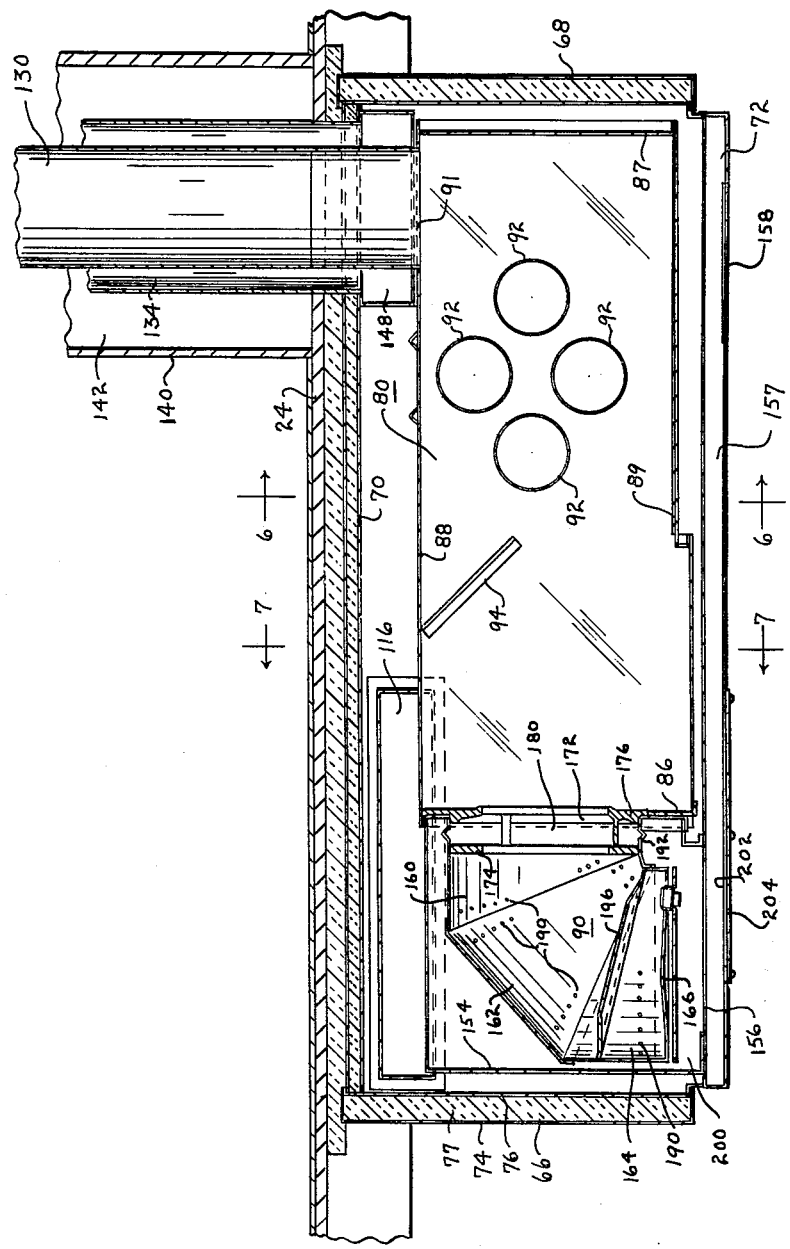

2,998,004
HEATING UNIT
Ray Eberhart, 317 E. Jefferson Blvd., Mishawaka, Ind., and John F. Hanfland, South Bend, Ind.; said Hanfland assignor to said Eberhart
Filed July 3, 1958, Ser. No. 746,508
3 Claims. (Cl. 126—110)

The present invention relates to heating systems and more particularly to a heating system for heating mobile homes and the like.

The primary object of the present invention is to provide a low, compact hot air heating unit for heating relatively small structures, which can be placed under the floor in confined areas and yet effectively circulate the heated air through the living space in the structure.

Another object of the invention is to provide an efficient, oil fired hot air heating unit for mobile homes, which is mounted on the vehicle in fixed position beneath the floor of the living space and which is constructed and arranged to give improved roadability to the vehicle and to provide without change or adjustment adequate road clearance while the vehicle is being moved.

Another object of the invention is to provide a horizontally arranged oil consuming space heating unit for mobile homes and the like which is mounted on the structure beneath the floor and which is provided with an efficient air cooled stack adapted to pass upwardly through the structure in a confined area without any danger of overheating adjacent structure members.

A further object is to provide an efficient, safe hot air space heating unit which will operate either by forced draft or convection for transferring the heat from the heat exchanger through the space being heated.

Another object of the invention is to provide a heating system for mobile homes which can easily be installed on the vehicle structure beneath the floor and thereafter effectively controlled, and readily inspected, serviced and repaired.

Additional objects and advantages will become apparent from the following description and accompanying drawings, wherein:

FIGURE 2 is a side elevational view of my heating unit shown removed from the vehicle and with a portion of one side removed to better show the construction and operation of the unit;

FIGURE 4 is a horizontal cross sectional view of the heating unit taken on line 4—4 of FIGURE 2, with the cover of the blower housing removed;

FIGURE 5 is a vertical cross sectional view of the heating unit taken on line 5—5 of FIGURE 3;

FIGURE 7 is a vertical cross sectional view of the heating unit taken on line 7—7 of FIGURE 5.

Figure 1:
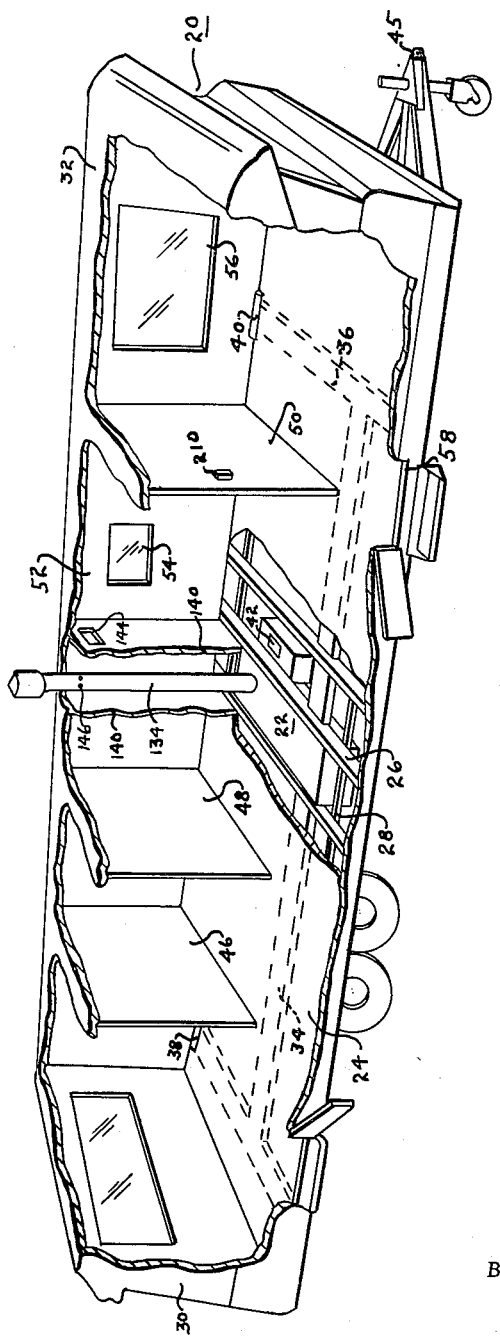
FIGURE 1 is a cutaway perspective view of a mobile home showing my heating system installed beneath the floor and the hot air duct connected to outlet registers.
Figure 6:
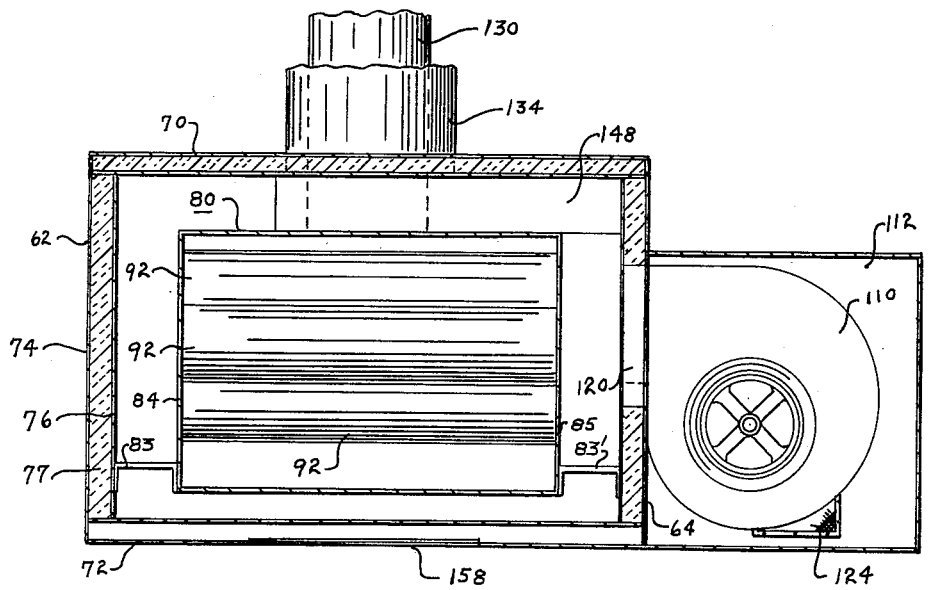
FIGURE 6 is a vertical cross sectional view of the heating unit taken on line 6—6 of FIGURE 5.
Figure 3:
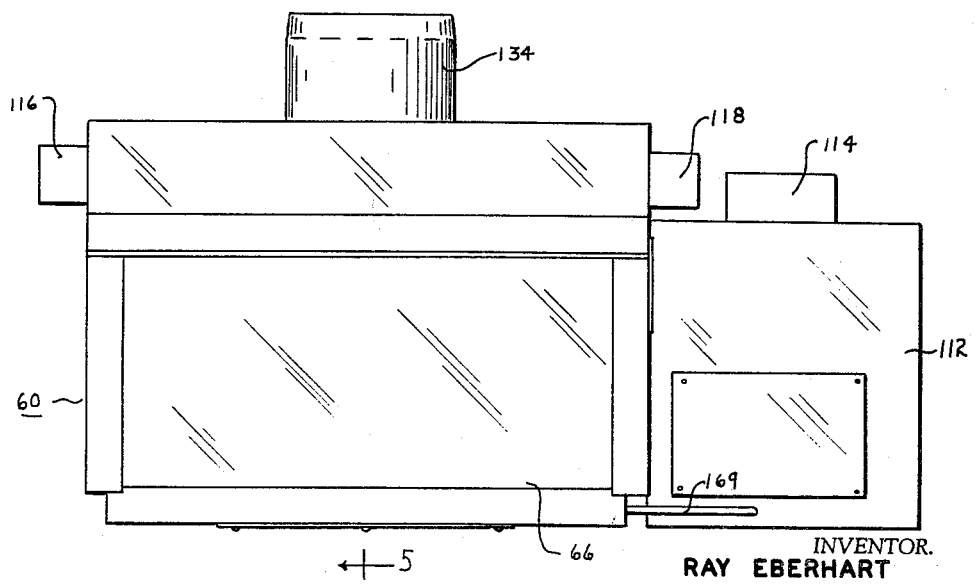
FIGURE 3 is an elevational end view of the heating unit shown removed from the vehicle.

Referring more specifically to the drawings and to FIGURE 1 in particular, numeral 20 designates a mobile home in which the present heating unit 22 is shown mounted beneath the floor 24 and rigidly secured to the joist 26 and frame members 28 by suitable fixtures (not shown). Portions of floor 24, side 30 and roof 32 have been broken away in the drawing to show the position of the unit in the home and the location of the hot air ducts 34 and 36 and registers 38 and 40. A cold air inlet 42 shown in the top of the heating unit is connected by a duct to one or more cold air registers (not shown) located in floor 24. The mobile home illustrated in FIGURE 1 is mounted on four wheels and is adapted to be connected to a towing vehicle by a coupling 45 at the front of the home. Partitions 46, 48 and 50 form compartments for bedrooms and bath, and side wall 52 is shown with the usual windows 54 and 56 and side wall 30 with door 58. While the present heating unit is particularly suitable for use with mobile homes and is so illustrated herein in detail, it is suitable for use as a heating unit in other structures and is especially adapted for use as an under-floor unit where the space is limited and installing and servicing would normally be difficult. For convenience of description, the illustration herein will be directed to its use in connection with a typical mobile home.

The housing 60 of the heating unit is generally rectangular in shape and consists of side panels 62 and 64, end panels 66 and 68, and top and bottom panels 70 and 72, respectively. The bottom panel is secured to the lower edges of the side and end panels and is adapted to be removed therefrom to facilitate installing, servicing, and repairing of the unit. The side, end and top panels are constructed of a sheet metal outside wall 74, a sheet metal inside wall 76, and a relatively thick layer of fireproof insulating material 77 such as fibreglass. Mounted inside housing 60 and spaced from the inside walls thereof is a heat exchanger 80 supported by brackets 82 and 82' and 83 and 83' secured to the side panels of the housing. The heat exchanger is constructed of sheet metal walls 84 and 85, ends 86 and 87, and top and bottom 88 and 89, respectively. The spacing of the heat exchanger from the side, end, and top and bottom panels permits the air being heated to surround the heat exchanger as it passes from the cold air return to the hot air ducts and not only provides good heating efficiently but also gives maximum safety from overheating. The heat exchanger which is relatively long and low and positioned horizontally in the housing is connected with an oil burner 90 at end 86 and with a flue 91 at the opposite end in top 88. In order to obtain maximum efficiency from the unit the heat exchanger contains four transversely arranged tubes 92 through which air passes while the unit is in operation, and on which the hot gases from the burner impinge in passing from the burner to the flue. A larger or smaller number of these hot air tubes may be used if desired. Interposed between burner 90 and tubes 92 is a diagonal positioned baffle 94 supported by the sides of the heat exchanger for deflecting the hot gases from the burner downwardly, around and between hot air tubes 92 so that most of the gases must contact or pass in the proximity of said tubes before reaching flue 91. The baffle together with the tubes further deflects some of the gases against the top, bottom and sides of the heat exchanger. It is thus seen that the gases in passing from the burner to the flue pass in direct contact with the top, sides, bottom and rear and around all four tubes of the heat exchanger and as a result give maximum heating efficiency.

A blower 110 is mounted at the side of housing 60 in a blower compartment 112 and draws air from the cold air return through opening 114 in the top of compartment 112 and forces it into housing 60 around the heat exchanger, through tubes 92, and thence through hot air ports 116 and 118 into hot air ducts 34 and 36, respectively. The particular type of blower is not important, the one shown being a conventional wheel type with a built-in electric motor. The cold air is drawn through the opening at the two sides of the blower and is discharged into the housing through opening 120 in panel 64 directly into tubes 92. In addition to recirculating the air from the space being heated, through the heating unit and back to the space, fresh air from the atmosphere is constantly drawn into the system through a screened port 124 in one end of blower compartment 112.

In order to utilize the heat normally discharged through the stack and to permit the stack to be placed in confined areas, a back draft construction is employed wherein air is drawn downwardly along the outside surface of the stack into the blower compartment where it is mixed with the air from the cold air return 114 and from fresh air port 124. This air is further heated by passing it through the housing around and/or through the heat exchanger before being discharged through the hot air ducts 34 and 36. The hot stack 130 is round in cross section and is connected at its lower end to flue section 91 and passes upwardly through the floor structure 24 and roof 32 to the atmosphere. This stack is enclosed in a concentric cold stack 134 which surrounds the hot stack from the top of the heating unit to the ceiling of the home. For the purpose of interior decoration of the home, the two stacks are preferably enclosed by walls 140 forming a compartment 142 which is connected near its upper end with the space being heated by a suitable register 144 as seen in FIGURE 1. The space between the hot and cold stacks is connected with compartment 142 near the ceiling by a plurality of holes 146 in the upper end of the cold stack, and is connected with the blower compartment 112 by duct 148 and passage 150 in side panel 64, and opening 152. While the blower is in operation, air is constantly drawn from the room being heated through register 144, holes 146, downwardly through the space between the cold and hot stacks and thence through duct 148, passage 150 and hole 152 into the blower compartment where it is mixed with the air therein and recirculated through the heating unit and room. While the drawings show the space between the cold and hot stacks connected with the room, as a modified form the cold stack may extend through the roof and communicate with the outside atmosphere to provide additional fresh air for the system.

Burner 90 is attached to heat exchanger end 86 and is enclosed in a shell 154 completely separating the burner from the space around the heat exchanger and being connected to the atmosphere for combustion air through an opening 156, passage 157 in housing bottom 72, and a screened opening 158. The burner, which is of the type disclosed in U.S. Patent No. 2,603,282, has an elbow-like body, generally cylindrical in section, and composed of three individually cylindrical sections 160, 162 and 164, suitably secured together in end-to-end relation. The lower end of section 164 is closed by a floor 166, of gently sloping conical form, which floor constitutes a vaporizing surface for the fuel introduced thereinto through an inlet 168, disposed at the side thereof, and which directly communicates through conduit 169 with a float controlled feed valve 170. An electrical fuel igniter 171 is shown schematically in the burner near inlet 168 and is controlled automatically by heating system controls. Section 160 is secured to a mounting ring 172 having an inner annular flange 174 and an outer annular flange 176, the latter flange extending through a hole 178 in end 86 and being secured in gas-tight relation to said end. The annular flange 176 defines the flame and hot gases discharge port 180 of the burner.

Burner 90 is provided with rows of circumferentially distributed primary air inlet openings 190, and with a series of secondary inlet openings 192 (said holes being only partially shown). The secondary openings 192 occupy the space between the burner ring 176, and the annular ring 174. The primary air openings 190 are distributed throughout most of the space between the ring 174 and the floor 166, an intermediate baffle 196 being located somewhat above the lowest series of openings 190. The burner chamber 200 formed by shell 154 is accessible for service and repair through an opening 202 in bottom 72 and hole 156, the opening normally being fully closed by a cover 204 secured by screws to the bottom. The previously identified hole 156, passage 157 and opening 158 supply the burner with combustion air which is warmed as it passes through passage 157. It will be appreciated that shell 154 and the remote inlet opening 158 connected to said shell by the air warming passage 157 promote stability of operation by protecting the burner body against eddies, gusts and cold drafts.

For the purpose of the present description, control device 170 may be considered conventional, including a float operated valve and an off-on fuel control valve, and will not be described in detail herein. Bracket 206 secured to the side of compartment 208 supports the device at approximately the required height in relation to the pot to place the fuel level in the device one half inch above the bottom of the pot. The fuel is delivered from a supply tank to the device through a conduit 169 and a valve in the device controls the flow of fuel to the burner in response to a thermostat 210 located in the space being heated. The valve in the control device turns on the flow of fuel to the burner when heat is required in the space and shuts off the fuel when the temperature in the space has reached the setting on the thermostat. After the valve has shut off the flow of fuel to the burner, sufficient fuel is supplied to the pot to maintain a low fire at the inlet 168.

The operation of the present heating system is regulated by well known conventional and standard controls, including high and low level limit switch 220, blower switch and ignition control. These controls are located in control box 222 accessible through door 224 in the side of the housing adjacent the burner. The operation of these controls will be briefly mentioned in connection with the description of the operation of the present heating system.

In the operation of the heating system, fuel is supplied to constant level control device 170 from a supply tank located outside of the mobile home and delivered therefrom to the burner. When the thermostat switch in the room being heated closes in response to a decrease in the temperature in the room, the valve in fuel control device 170 opens and admits a relatively large flow of fuel into the bottom of the pot. Since the pot is maintained hot by the low fire, the fuel on entering the pot immediately vaporizes and is ignited by the pilot flame. While the burner is in full operation, a large flame and hot gases are emitted substantially horizontally from port 180 into the heat exchanger and are sufficient to thoroughly heat the heat exchanger as they pass beneath the top, along baffle 94, thence around tubes 92 and through flue 91 and stack 130. When the air in the space between the heat exchanger and the housing reaches a predetermined degree, the blower switch closes, starting the blower which draws cold air from the cold air return ducts through opening 114 in the top of the blower compartment 112, and simultaneously draws air from near the ceiling of the room being heated through register 144, holes 146, downwardly through the space between stacks 130 and 134, through duct 148 and passages 150 into blower compartment 112. The air as it passes downwardly in the space between the two stacks is partially heated by the hot stack which is cooled sufficiently to render it safe for use in limited space. The air from the cold air return and from the cold stack is discharged from the blower into the space between the heat exchanger and the housing and through tubes 92 where it is heated to the desired temperature and thence forced from the housing through hot air ducts 34 and 36 to registers 38 and 40 in the space being heated.

The present system balances itself and furnishes sufficient fresh air as necessary to replace the air escaping from the room. As the air leaks from the room either through an open door or window or through ventilators, air is drawn into the system through air port 124 in the side of compartment 112, thus providing fresh heated air for the room without cold drafts. When the room reaches the desired temperature as determined by thermostat 210 the fuel flow to the burner is shut off by the valve in control device 170, with the exception of that necessary to maintain the low fire, and as the air in the space around the heat exchanger reaches a predetermined low level the blower shuts off. The heating unit remains in this condition until the room thermostatic switch again closes, restarting the heating cycle.

While only one embodiment of my heating system has been described in detail herein, various changes and modifications can be made without departing from the scope of the present invention.

We claim:

1. A heating unit for under floor installation in mobile homes, trailers and the like, comprising an elongated rectangular sectioned housing, a hot air conduit extending through said housing, a rectangular sectioned heat exchanger in said housing, a means supporting said heat exchanger in spaced relation to the walls of said housing, a flue in the top of said heat exchanger near one end thereof, means defining an opening in the end of said heat exchanger opposite said flue, an elbow-shaped pot-type burner substantially as tall as said heat exchanger mounted in said housing and having a wall structure defining a horizontal flame discharge opening in communication with the opening in the end of said heat exchanger, four transversely arranged air tubes extending through said heat exchanger and communicating with the space surrounding said heat exchanger on opposite sides thereof, a flame deflecting baffle disposed between said opening in the end of said heat exchanger and said tubes and extending diagonally downwardly from the top of the heat exchanger, a shell enclosing said burner joined to the end of said heat exchanger and the bottom of said housing, a combustion air inlet in the bottom of said shell, a passage in the bottom of said housing extending substantially the full length of the heat exchanger and communicating with the outside atmosphere and with said combustion air inlet, a vertical hot stack connected to said flue, a vertical cold stack surrounding said hot stack and spaced therefrom, a blower for discharging air into the side of said housing in the vicinity of said tubes, a housing enclosing said blower, a conduit connecting the bottom of said cold stack with said blower housing, a conduit for connecting said blower housing with a cold air return, and means defining a port for connecting said blower housing with the atmosphere.

2. A heating unit, comprising an elongated rectangular sectioned housing, a hot air conduit extending through said housing, a rectangular sectioned heat exchanger in said housing spaced from the walls thereof, a flue in the top of said heat exchanger near one end thereof, means defining an opening in the end of said heat exchanger opposite said flue, an elbow-shaped pot-type burner substantially as tall as said heat exchanger mounted in said housing and having a wall structure defining a horizontal flame discharge opening in communication with the opening in the end of said heat exchanger, a plurality of transversely arranged air tubes extending through said heat exchanger and communicating with the space surrounding said heat exchanger on opposite sides thereof, a shell enclosing said burner joined to the end of said heat exchanger and the bottom of said housing, a combustion air inlet in the bottom of said shell, a passage in the bottom of said housing extending substantially the full length of the heat exchanger and communicating with the outside atmosphere and with said combustion air inlet, a vertical hot stack connected to said flue, a vertical cold stack surrounding said hot stack and spaced therefrom, a blower for discharging air into the side of said housing in the vicinity of said tubes, a housing enclosing said blower, and a conduit connecting the bottom of said cold stack with said blower housing.

3. A heating unit for under floor installation in mobile homes, trailers and the like, comprising a housing, a hot air conduit extending through said housing, a rectangular sectioned heat exchanger in said housing spaced from the walls thereof, a flue in the top of said heat exchanger near one end thereof, means defining an opening in the end of said heat exchanger opposite said flue, a pot-type burner having a wall structure defining a horizontal flame discharge opening in communication with the opening in the end of said heat exchanger, a plurality of transversely arranged air tubes extending through said heat exchanger and communicating with the space surrounding said heat exchanger on opposite sides thereof, a vertical hot stack connected to said flue, a vertical cold stack surrounding said hot stack and spaced therefrom, a blower for discharging air into the side of said housing in the vicinity of said tubes, a housing enclosing said blower, a conduit connecting the bottom of said cold stack with said blower housing, and a conduit for connecting said blower housing with a cold air return.

References Cited in the file of this patent

UNITED STATES PATENTS

| 2,023,602 | Lithman | Dec. 10, 1935 |
|---|---|---|
| 2,242,802 | Stramaglia | May 20, 1941 |
| 2,243,503 | Frenette | May 27, 1941 |
| 2,283,407 | Bassett et al. | May 19, 1942 |
| 2,311,570 | Pyle | Feb. 16, 1943 |
| 2,473,562 | Barnes | June 21, 1949 |
| 2,496,505 | Thompson | Feb. 7, 1950 |
| 2,603,282 | Schueder et al. | July 15, 1952 |
| 2,804,869 | Besser | Sept. 3, 1957 |

FOREIGN PATENTS

| 837,908 | France | May 13, 1938 |
|---|---|---|